United States Patent Office 3,470,292
Patented Sept. 30, 1969

3,470,292
FILM-FORMING COMPOSITION CONTAINING A PHOSPHATIDE AND A SILOXANE
Frank William Marschner, East Orange, N.J., assignor to Colgate-Palmolive Company, New York, N.Y., a corporation of Delaware
No Drawing. Filed June 1, 1965, Ser. No. 460,491
Int. Cl. A61l 23/00; A61k 9/00
U.S. Cl. 424—47           7 Claims

ABSTRACT OF THE DISCLOSURE

A film forming protective aerosol composition for topical application containing a phosphatide and a siloxane.

---

The present invention relates to improved compositions for rendering the skin repellent to hydrous and oily materials and, more particularly, to improved compositions for rendering the skin repellent to hydrous and oily materials and available as an aerosol.

The protection of the human skin from the elements or from the effect of acids, alkalies, and other materials which have a corrosive or other painful or harmful or unaesthetic affect upon the human skin has been the subject of many investigations and a host of products.

For example, in 1871 U.S. Patent No. 111,376, issued describing and claiming a product for application to the hands of chemists, dyers, photographers and the like to provide the so-coated hands with a protective coating. The product comprised paraffin and a solvent therefor such as a lubricating oil.

In 1915 U.S. Patent No. 1,149,777, issued in which a protective coating comprising gum Tragacanth and starchy material is described. In 1926 U.S. Patent No. 1,574,733, issued in which another product comprising gelatinous forming clay, pure soap and water is described. In 1928 U.S. Patent No. 1,668,382, issued in which another protective coating product is described. The 1928 product comprises zinc oxide admixed with a syrup produced by concentrating skim milk and mixing glycerine therewith. The zinc oxide-syrup product is a viscous liquid which when applied to the skin produces a varnish-like covering, which dries quickly, is flexible, is soluble in water, and is easily removed by washing. U.S. Patent No. 1,638,709, provides a disclosure of an acid-resisting compound for the protection of the hands which comprises white lead, linseed oil thinned with gasoline, admixed with baking soda, resin, castor oil (thinned with alcohol) and eucalyptus oil. Other U.S. Patents describing formulations for a protective coating which issued prior to 1948 are U.S. Patents Nos. 1,649,336; 1,697,936; 2,021,131; 2,120,-569; and 2,354,319.

In 1948 U.S. Patent No. 2,435,005, issued in which skin protective creams and ointments are described. As the patentee defines his product it consists of an alcogel of an inorganic gelatinous hydrous oxide, e.g., aluminum hydrate, ferric hydrate, or zirconium hydrate, having absorbed thereon an organic skin protective compound substantially insoluble in water but soluble in alcohol, a film-forming composition, such as a mixture of ethyl cellulose and shellac, and a volatile solvent for the latter, the compositon forming a flexible porous film upon evaporation of the solvent.

In U.S. Patent No. 2,698,824, issued in 1955 provided the art with a description of a skin protective which can be applied from a cream or ointment base. The patented skin protective composition comprises a plastic residue consisting essentially of a nitrocellulose, an organopolysiloxane, and an innocuous, nitrocellulose-compatible oil, said residue being dispersed in an aqueous oil-in-water emulsion type cream base.

In 1955 U.S. Patent No. 2,727,846, issued in which the nitrocellulose of U.S. Patent No. 2,698,824 is eliminated and a moisture repellant skin protectant dressing described which consists of an unreacted homogeneous mixture of 3 to 45 percent by volume of at least one material selected from the group consisting of methyl siloxanes, ethyl siloxanes, and phenyl siloxanes having a viscosity for from about 20 to about 60,000 centistokes and from about 97 to 55 percent by volume of petroleum.

U.S. Patent No. 2,876,164, issued in 1959. Therein is described a dermatological preparation containing as an essential constituent a stabilized defatted soy bean flour consisting of a mixture of a colloidal soy bean flour having a protein content of from 40% to 55% by weight and a carbohydrate content of from 25% to 30% by weight and from 5% to 15% by weight based on the weight of the soy bean flour of an organic acid containing from 2 to 6 carbon atoms from the group consisting of monocarboxylic, dicarboxylic, and tricarboxylic aliphatic acids.

In 1963 U.S. Patent No. 3,100,180, issued to G. R. Smith and R. C. Wands for compositons for rendering the skin repellent to hydrous and oily materials. These patentees summarize the need for compositions which, when applied to the human skin and particularly to the hands and arms, provide a protective coating in the following statements:

There are many situations in which the human skin is exposed to hydrous and/or oily materials which have undesirable effects. These effects may include corrosive or irritating action which can vary from slight reddening to actual damage such as vesication or ulceration; or the effects may be undesirable for reasons of cleanliness or appearance as, for example, soiling the skin with grease in mechanical operations or with ink in office work or printing.

It has long been known that the skin can be protected from the effects of the cleansing required to remove injurious materials, by the application of lotions, creams and other emollient compositions. These preparations of the prior art are intended to exert a beautifying, softening and lubricating effect in the skin and may even contain medicinal ingredients. Other compositions have been described which have the effect of producing a barrier film on the skin which will prevent absorption of harmful or cosmetically undesirable substances. However, the preparations heretofore known for the purposes described, while effective to some degree, have all suffered from certain disadvantages. Mere emollients fail to protect the skin from exposure to the injurious materials and only serve as palliative remedies afterwards. Barrier creams have been useful for certain specific conditions, but heretofore have failed to have broad general applicability. Furthermore, in maintaining personal hygiene, for example, by washing the hands, these compositions of the prior art are largely removed and repeated application is necessary. In some cases, the preparation may be oil-repellent, on application, but even a few drops of water alone will disrupt the film and nullify the effect. It is evident that under such conditions the benefits obtained are not lasting and exposure to irritants and colorants may not actually be affected at all since the protection is readily removed.

These patentees also note that it has been proposed to employ siloxanes in lotions, creams, and other cosmetic materials for the purpose of providing residual protective barriers on the skin and refer specifically to the use of siloxanes described in U.S. Patent No. 2,727,846. However, as these patentees emphasize while the siloxanes have been employed for the purpose of providing residual protective barriers on the skin with considerable success nevertheless the siloxanes are themselves oily and when effective amounts are applied to the skin, the residue may give rise to an unpleasantly oily subjective sensation, particularly when applied as a dressing. The other disadvantages of siloxanes as residual barriers on the skin are set forth by these patentees in the following words:

It has been proposed to incorporate particular ingredients in lotions, creams and other cosmetic materials for the purpose of providing residual protective barriers on the skin. Siloxanes have been so employed, as described in U.S. Patent No. 2,727,846, with considerable success; but these substances are themselves oily and when effective amounts are applied to the skin, the residue may give rise to an unpleasantly oily subjective sensation, particularly when applied as a dressing.

Liquid organo-silicon compounds such as the siloxanes are easily transferred from the hands by touch or slight abrasion. This is a serious drawback in that even traces of such substances may bring about contamination of industrial equipment to such an extent as to interfere with proper process conditions. It is well-known that the presence of even traces of silicones will interfere with the action of adhesives, paints and protective coatings. Furthermore, to be effective, a coating of a siloxane must be applied which is virtually continuous and such a coating adversely impairs access of air and transpiration of moisture which is needed for the well-being of the skin. To obtain effective results, concentrations of silicone up to as high as 52 percent have been employed and these have been described as not always pleasing from a cosmetic viewpoint. The silicone-containing preparations should not be applied to even moderately inflamed skin, as pointed out by Suskind in Industrial Medicine and Surgery, v. 24, pp. 413–416, September 1955. It is noted that when water is applied to skin surfaces coated with siloxanes, the water is repelled to the extent that it forms into droplets having a low contact angle with the skin. The compositions of the present invention do not cause this and water spreads normally, thus giving a normal subjective effect; but nevertheless, the effects of aqueous irritants are prevented.

A composition is disclosed in U.S. Patent No. 3,100,180 for topical application which consists essentially of a water miscible pharmaceutical extending medium having an aqueous base and containing a dispersed bodying agent and having homogeneously dispersed therein a latex-like dispersion of an aleophobic and hydrophobic physiologically inert stable fluorine-containing elastomeric vinyl polymer.

Thus with the disclosure in U.S. Patent No. 2,727,846 a dermatological preparation consisting of a homogeneous mixture of at least one siliioxane and petroleum and with the condemnation of siloxanes as dermatological preparations set forth in U.S. Patent No. 3,100,180, it is surprising that it has now been discovered that a base or carrier or vehicle or a dermatological preparation consisting essentially of at least one siloxane and at least one phosphatide imparts a desirable level of emolliency to the skin, does cause skin dryness after washing, and is not readily removed from the skin during normal washing of the hands.

The most readily available phosphatide is lecithin. In "A New Dictionary of Chemistry," ed., L. M. Miall, Interscience Publishers, New York 1961, lecithin is said to be "A generic name for substances of the formula

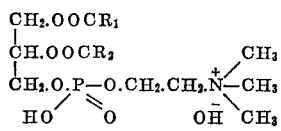

wherein $R_1$ and $R_2$ are fatty acid residues. Usually one acid is saturated and one unsaturated. . . . Commercial lecithin is a mixture of phosphatides and glycerides obtained in the manufacture of soya bean oil."

In "The Merck Index" (Sixth edition), lecithin is said to be "A mixture of the diglycerides of stearic, palmitic and oleic acids, linked to the choline ester of phosphoric acid; approx. $C_{43}H_{88}NO_9P$; about 4% phosphorous."

In the dictionary edited by L. M. Miall, to which reference has been made hereinbefore, phosphatides, phospholipin(e)s, phospholipid(e)s are synonymous and defined as "A group of substances of a fatty nature which are essential components of all animal and vegetable cells. They contain phosphorous and nitrogen and on hydrolysis give fatty acids, phosphoric acid, and basic substances such as choline. . . . Included in the phosphatides are lecithin, kephalin, and sphingomyelin.

It is an object of the present invention to provide a means of imparting long-lasting water-repellency and emolliency to the skin which are not readily removed by normal washing methods.

It is another object of the present invention to provide a carrier or vehicle or pharmaceutical base for medicaments such as bacteriostats and the like.

It is a further object of the present invention to provide a composition adopted for topical application comprising at least one phosphatide and at least one siloxane.

It is also within the scope of the present invention to provide a self-propelling composition adapted to deposit a protective coating on the human skin especially on the hands for dishwashing and general household use which has enduring water repellency and emolliency to the skin and which is not readily removed by the usual methods of washing the hands.

These and other objects will become apparent to those skilled in the art from the following description of the present invention.

Of the various known phosphatides lecithin obtained generally from soya bean is most readily available commercially. Accordingly, the presently preferred phosphatide is lecithin which has been stated hereinbefore is a mixture of phosphatides and glycerides. Lecithin, when applied to the hands was found to give unusually long lasting emolliency to the skin even after repeated washings in the usual manner with soap. A lecithin film or coating also provided limited water repellency. Siloxanes, when applied to the hands showed excellent water repellent properties, but was easily removed often causing skin dryness after washing. However, when a composition consisting essentially of lecithin and siloxane was applied to the skin it was found that the combination of phosphatide and siloxane imparted a desirable level of emolliency and water repellency to the skin. In addition, the composition consisting essentially of phosphatide and siloxane was not readily removed from the skin by normal washing of the hands. Thus, the combination of phosphatide and siloxane did not have the disadvantage of being easily removed and causing skin dryness after washing as did siloxane alone and did not have the disadvantage of limited water repellency of lecithin alone.

It has been found that for use as protective coating for the hands, for dishwashing and general household use, as an emollient and protective coating under rubber gloves for the surgeon, as a base or carrier for medicaments a combination of at least one phosphatide, and at least one siloxane in the proportion of about 20 to about 80 parts by weight of siloxane to one part by weight of phosphatide provides a protective film or coating which has enduring water repellency and emolliency to the human skin and which is not readily removed in the usual methods of washing the hands or other parts of the human body.

Illustrative of the presently preferred proportions of siloxane and phosphatide for application to the human skin especially the skin of the hands as a protective coating or film during dishwashing or for general household use is the self-propelling formulation prepared from the film-forming materials lecithin and the presently preferred siloxane, methyl polysiloxane commercially available as "Dow Corning 200 Fluid Silicone" having a viscosity of about 500 centistokes. The film-forming materials and the liquid propellant are charged to a hermitically sealed container having any suitable dispersing valve in the presently preferred proportions set forth in the following tabulation:

| Ingredients: | Weight percent |
|---|---|
| Film-forming material | 2.0 |
| Liquid propellant | 98.0 |
| Film-forming material (ingredients): | Parts by weight |
| Methyl polysiloxane | 3 |
| Soy bean lecithin | 1 |
| Propellent (ingredients): | Weight percent |
| Trichloromonofluoro methane | 50.0 |
| Dichlorodifluoromethane | 50.0 |

As is well-known a siloxane is one of a group of compounds having a characteristic silicon-oxygen-silicon linkage. The structural formula for these compounds is

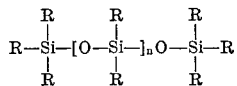

where
R is a hydrocarbon radical such as $CH_3$—, $C_2H_5$—, $C_3H_7$—, $C_4H_9$—, $C_5H_{11}$—, $C_6H_5$—, and $C_6H_5CH_2$—, and
$n$ is an integer.

The suitable siloxanes are those having a viscosity in the range of about 100 to about 1000 centistokes, for example, methyl polysiloxane having a viscosity of 500 centistokes.

The propellent is one or more of the partially or wholly fluorinated, partially chlorinated and partially fluorinated aliphatic hydrocarbons having not more than two carbon atoms such as tetrachlorodifluoroethane, trichlorotrifluoroethane, dibromotetrafluoroethane, trichloromonofluoromethane, dichlorotetrafluoroethane, octafluorocyclobutane, dichlorodifluoromethane, pentafluoromonochloroethane, difluoromonochloromethane, trifluoromonobromomethane, hexafluoroethane, trifluoromonochloromethane, trifluoromethane, tetrafluoromethane. The vapor pressure of the propellant or propellant blend must comply with the ICC regulations and not exceed about 135 p.s.i.g. at 130° F. and is about 40 to 70 p.s.i.g. at 70° F. Accordingly, it is preferred to employ propellant blends having vapor pressures at 70° F. in the range of about 50 to 65 p.s.i.g.

A convenient and economical method of applying the phosphatide-siloxane water-resistant film-forming skin-protective composition is as an aerosol. The siloxane and phosphatide in the proportions set forth hereinbefore are mixed with the halogenated propellent in the proportion by weight of about 0.1 to about 10 parts of the siloxane-phosphatide combination with about 99.9 to about 90 parts of propellant.

In general, the phosphatide-siloxane combination is introduced into an "aerosol" can and the propellent then introduced into the "aerosol" can. The can is fitted with a dispensing valve, a dip tube. To dispense the siloxane-phosphatide combinaton as a spray the "aerosol" can was fitted with an (0.18 inch by 0.080 inch) "Precision" valve, a dip tube and a 0.018 inch reverse taper button. When the hands are sprayed up and down on both sides and rubbed together a non-oily and non-sticky water resistant film is obtained with unusually pleasant emollient properties. By adjustment of the valve and actuator parameters either a dry or wet spray can be obtained.

While the application of a film on the hands for protection thereof during the washing of dishes or the performance of other household tasks is most economically and conveniently achieved by use of the siloxane-phosphatide combination as an aerosol, those skilled in the art will understand that the siloxane-phosphatide combination can be used as a base or carrier for liquids, lotions, and pastes for application by other than aerosol methods.

What is claimed is:

1. A film-forming water-resistant protective for topical application which comprises from about 0.1 to about 10 percent of a base and the balance to make 100 percent of propellant selected from the group consisting of flourinated, chlorinated and brominated aliphatic hydrocarbons having not more than two carbon atoms and mixtures thereof, said propellant having a vapor pressure in the range of about 40 to 70 p.s.i.g. at 70° F. and a vapor pressure not exceeding about 135 p.s.i.g. at 130° F., said base consisting of at least one phosphatide selected from the group consisting of lecithin, kephalin, and sphingomyelin and at least one siloxane having a viscosity in the range of from about 100 to about 1000 centistokes, the ratio of said phosphatide to said siloxane being from about 1 to 1 to about 1 to 3.

2. The composition of claim 1 wherein the phosphatide is lecithin.

3. The composition of claim 1 wherein the siloxane is methyl polysiloxane.

4. The composition of claim 1 wherein the phosphatide is lecithin and the siloxane is methyl polysiloxane.

5. The composition of claim 1 wherein the base is about two percent.

6. The composition of claim 1 wherein the phosphatide is lecithin, wherein the siloxane is methyl polysiloxane, wherein the ration of lecithin to methyl polysiloxane is one to about three, wherein the base is about two percent of the composition, and wherein the propellent is a mixture of trichloromonofluoromethane and dichlorodifluoromethane.

7. A film-forming water-resistant protective composition for topical application which comprises about 1.5 percent by weight of methyl polysiloxane, about 0.5 percent of lecithin, and about 98 percent of propellent, said propellant comprising about 50 percent of trichloromonofluoromethane and about 50 percent of dichlorodifluoromethane.

References Cited

FOREIGN PATENTS 205,175   2/1959   Austria.

OTHER REFERENCES

Schimmel, Briefs (I) December 1935, No. 9.
Schimmel, Briefs (II) October 1936, No. 19.
Schimmel, Briefs (III) April 1938, No. 37.
Schimmel, Briefs (IV) January 1942, No. 82.
Schimmel, Briefs (V) October 1942, No. 91.
Pail, Aeroso Age, December 1962, pp. 1–4, 252/305.
Pail et al., American Perfumer, January 1962, vol. 77, pp. 62–64.
Fisher, Aeroso Age, April 1959, vol. 4, No. 4, pp. 38, 40, 86 and 87, 252/305.
Shepherd, Aerosols: Science and Technology 1961, pp. 223–227.

ALBERT T. MEYERS, Primary Examiner

D. R. MAHANAND, Assistant Examiner

U.S. Cl. XR.
424—184, 365

UNITED STATES PATENT OFFICE
CERTIFICATE OF CORRECTION

Patent No. 3,470,292        Dated September 30, 1969

Inventor(s) Frank William Marschner

It is certified that error appears in the above-identified patent and that said Letters Patent are hereby corrected as shown below:

Column 1, line 65, change "compositon" to --composition--.

Column 2, line 10, change "for" to --of--.

Column 6, line 11, after "protective" insert --composition--.

Column 6, line 36, change "ration" to --ratio--.

SIGNED AND
SEALED
JUL 21 1970

(SEAL)
Attest:

Edward M. Fletcher, Jr.
Attesting Officer

WILLIAM E. SCHUYLER, JR.
Commissioner of Patents